US012493605B2

(12) United States Patent
Garcia Molina

(10) Patent No.: US 12,493,605 B2
(45) Date of Patent: Dec. 9, 2025

(54) DATA TRANSMISSION METHOD

(71) Applicant: AL KAMEL SYSTEMS, S.L., La Garriga (ES)

(72) Inventor: José Luis Garcia Molina, La Garriga (ES)

(73) Assignee: AL KAMEL SYSTEMS, S.L., La Garriga (ES)

( * ) Notice: Subject to any disclaimer, the term of this patent is extended or adjusted under 35 U.S.C. 154(b) by 0 days.

(21) Appl. No.: 17/852,240

(22) Filed: Jun. 28, 2022

(65) Prior Publication Data
US 2023/0004544 A1 Jan. 5, 2023

(30) Foreign Application Priority Data

Jun. 30, 2021 (EP) .................................. 21382575

(51) Int. Cl.
*H04L 9/00* (2022.01)
*G06F 16/23* (2019.01)
*G06F 21/31* (2013.01)

(52) U.S. Cl.
CPC .............. *G06F 16/23* (2019.01); *G06F 21/31* (2013.01)

(58) Field of Classification Search
None
See application file for complete search history.

(56) References Cited

U.S. PATENT DOCUMENTS

| 6,751,634 | B1* | 6/2004 | Judd .................... G06F 16/2365 |
| 9,398,078 | B1* | 7/2016 | Mendes da Costa ....................... H04L 67/131 |
| 2015/0288578 | A1* | 10/2015 | Schwengler .......... H04L 63/104 705/39 |
| 2019/0123928 | A1 | 4/2019 | Aston | |
| 2019/0319781 | A1* | 10/2019 | Chhabra ............... G06F 3/0655 |

FOREIGN PATENT DOCUMENTS

CN 110351288 A 10/2019

OTHER PUBLICATIONS

Extended European Search Report for European Patent Application 21382575.5-1213 isued by the European Patent Office dated Dec. 16, 2021, in English, 9 pgs.
Web Article "Keeping it simple: Using Server-Sent Event (SSE) to power a live UI" authored by Ryan Bell, dated Jan. 17, 2020, retrieved Aug. 12, 2021 from the internet at the URL https://datto.engineering/post/powering-a-live-ui-with-server-sent-events, in English.

* cited by examiner

*Primary Examiner* — Tuankhanh D Phan
(74) *Attorney, Agent, or Firm* — Shakir Law PLLC; Hassan A. Shakir

(57) ABSTRACT

A data transmission method for the transmission of information between a server and at least one authenticated device, and in particular it is directed to a method for transmitting a set of data with a tree configuration over a computer network sending differential status updates from a single source, or server, to a plurality of user devices.

7 Claims, 2 Drawing Sheets

DATA TRANSMISSION METHOD

CROSS-REFERENCE TO RELATED APPLICATIONS

This application is based on and claims priority under 35 U.S.C. § 119 to patent application EP21382575.5 filed on 30 Jun. 2021, which is pending and which is hereby incorporated by reference in its entirety for all purposes.

OBJECT OF THE INVENTION

The present invention relates to a data transmission method fort the transmission of information between a server and at least one authenticated device, and in particular it is directed to a method for transmitting a set of data with a tree configuration over a computer network sending differential status updates from a single source, or server, to a plurality of user devices

BACKGROUND OF THE INVENTION

A number of data transmission protocols are currently being used in many different areas. Some of these protocols are optimized for video streaming, instant messaging or encryption, among other applications, depending on which transmission parameter is more critical, but most transmission or communication protocols rely on the transmission of large data packets which generally consume a substantial bandwidth throughout long periods of time and are thus prone to transmission errors and timeouts.

In the area of sports, and particularly of motorsports, the transmission of data relating to timing, classification, track information, weather conditions, telemetry, and other data fields is highly time-critical, with certain information items being valid only for very short periods of time. In such cases, the transmission of large data packets not only might saturate the available bandwidth but it can also arrive too late to be useful for the recipient. Moreover, use conditions might limit the data transmission to a certain number of duly authenticated clients, rather than broadcasting or streaming the whole set of data without restrictions.

Current protocols fail to provide an adequate solution for a low bandwidth consumption and real time transmission of data which could fulfil the transmission needs of events such as sport venues, and therefore there is a need for such a method.

DESCRIPTION OF THE INVENTION

The present invention solves the above-mentioned problems by means of a transmission protocol, or method, which transmits information over a computer network sending differential status updates from a single source, or server, to a plurality of user devices. By sending differential status update must be understood sending only the part of information of a data record which has changed over a given period of time.

In a first inventive aspect, the invention provides a data transmission method for the transmission of data between a server and at least one authenticated user device, wherein the server comprises a data set stored in the server, and wherein the at least one authenticated user device is in data communication with the server;

wherein the data set has a tree structure configuration, comprising at least a root node comprising at least one parent node, with each parent node comprising at least one child node, wherein the data of the at least one child node is updated at intervals of time i;

the method comprising, by the server, the steps of:
sending, at a time $t_0=0$, the complete data set to the at least one authenticated user device,
and, for each time $t_n=n \cdot i$, with $n=1, \ldots, N$, when the data of the at least one child node has been updated in respect to the time $t_{n-1}$,
sending the updated data of the at least one child node to the at least one authenticated user device.

User device or client device must be understood as any hardware component which can be accessed by the recipient of the information, normally a human user; in a preferred example, the user device may be a personal computer or a smartphone; preferably, the user device has a software installed capable of receiving the data set, storing it, and receive periodical updates. By server must be understood a computer in data communication with one or more user devices; the server comprises data storage means to store at least the data set and a software capable of executing the method. Preferably, the server is in data communication with the user devices by means of an Internet connection, although other configurations are possible. The server further comprises means to receive and update the references of the data set, such as a data communication with other servers, measurement devices or human input.

According the invention, the data is sent, or transmitted, by a server in real time through differential status updates to make use of a reduced bandwidth, to an authenticated user device, which provides a secure connection to ensure the privacy and integrity of data. By real time should be understood very short time intervals such that the perception by a human user is that of an instantaneous response of the server; in hardware level, however, it might mean several clock cycles of the server.

Initially, during the first connection, the whole tree-structure data set is sent to the user device, with a set of initial values for each record. The data structure is stored and kept in the user device during the length of a venue or indefinitely, and it is regularly updated with transmission of the changes in the records, minimizing the bandwidth usage. These updates contain only the changes in the data records with respect to the latest version of data stored in the user device.

The tree structure dataset comprises a root node and a plurality of parent and child nodes, hierarchically organized, or in other words, a group of child nodes depends on a first parent node, another group of child nodes depends in turn on a second parent node, whereas all the parent nodes are dependent on the root node and so on; alternatively, there may be additional levels of hierarchy either above the parent nodes, grandparent nodes, or below the child nodes, grandchild nodes; preferably, each node comprises different records of information such as timing, telemetry, weather information, etc.

Although this method is intended for data transmission in sporting events, it can be advantageously used in many other applications where an agile and secure distribution of information is required.

Besides of the high transmission speed and the reduced bandwidth use, the method has several other advantages. Since the server sends the data only to specific user devices, the polling is reduced and the response time is improved. A final user may choose to receive only certain fields of information by a subscription mechanism; the server sends to the user device updates of selected nodes, thus decreasing the traffic. The method can be easily expandable by adding nodes or renaming them according to the specific needs of each event. Furthermore, the rearrangement of the data structure does not require any modification in the user device.

In a particular embodiment, the data of the at least one parent node is updated at intervals of time i; and, when the data of the at least one parent node has been updated in respect to the time $t_{n-1}$, the method further comprising the step of sending the updated data of the at least one parent node to the at least one authenticated user device. Advantageously, the parent nodes can be also updated in a similar way as the child nodes.

In a particular embodiment, the method comprises the step of sending, at a time $t_{N+1}$, a complete updated data set to the at least one authenticated user device, and sending the updated data of the at least one child node or parent node to the at least one authenticated user device.

Advantageously, once the last time period of the event, $t_N$, has been reached, the method is started again at the time period $t_{N+1}$ with the transmission of a whole dataset to the user device or devices; the restart of the method may be motivated by a new event or a new iteration of the previous event.

In a particular embodiment, the method comprises the step of encrypting, by the server; the data of the data set. Advantageously, the encryption of data prevents a malicious access attempt to the transmitted data by a third party. Preferably, an SSL connection over TCP-IP is used to ensure the privacy and integrity of the data. When a user device connects to the server, it must authenticate and subscribe to the selected nodes. If the authentication is successful, the user device receives the data set and the updates.

In a particular embodiment, the data set comprises one or more grandparent nodes, and/or one or more grandchildren nodes. Advantageously, the data set might be expanded with the addition of hierarchical layers and levels, such as grandparent nodes, of a higher level than the parent nodes, but lower than the root node, and grandchild nodes, with a lower level of hierarchy than the child nodes. In and embodiment, the data set can be expanded with the addition of lower, higher or intermediate hierarchy nodes.

In a particular embodiment, the data set is formatted as a JSON file. Advantageously, the use of JSON formatted files allows the compatibility with any software, regardless of the programming language used. Preferably, data comes in fully structured nodes with JSON packages, which facilitates integration with any system that the user device is using.

In a particular embodiment, the data of the data set comprises race timing measurements. Advantageously, the race timing data can be transmitted in real time.

In a second inventive aspect, the invention provides a computer program comprising instructions which, when the program is executed by the server, cause the server to carry out the data transmission method of the first inventive aspect.

DESCRIPTION OF THE DRAWINGS

The foregoing and other advantages and features will be more fully understood from the following detailed description of exemplary embodiments with reference to the accompanying drawings, which should be considered by way of illustration and not limitation, in which.

PREFERRED EMBODIMENT OF THE INVENTION

Throughout the present document it will be understood that various parts of one embodiment of the invention can be freely combined with parts described in other embodiments, even being said combination not explicitly described, provided there is no harm in such combination.

Figure 1:
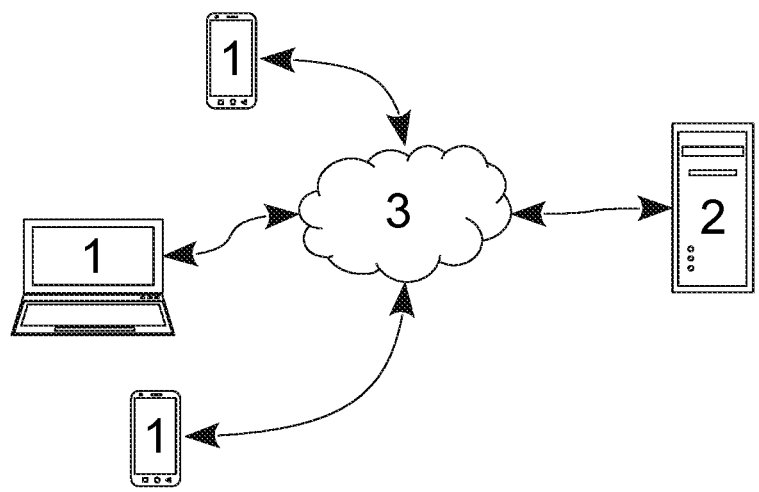
FIG. 1 This figure represents a schematic view of a server in data communication with a plurality of user devices.

The present invention is advantageously used in the transmission of rapidly changing data, such as racing data, between a server (2) and a plurality of user devices (1) over the Internet (3), forming a computer network, such as the computer network shown in FIG. 1. In a preferred embodiment, the user devices (1) comprise a combination of handheld devices, such as smartphones and tablets, and laptops or personal computers, each of them being accessed by a different user.

Preferably, from a user perspective, the transmission method is used by means of a service with subscription and authentication capabilities. Each user has the possibility to subscribe to one or more fields of information stored in respective nodes (5), such as the timing of two participants of a same team, receiving only updates for the desired information. Before the transmission of the data and the subsequent updates, the users need to register at the server (2) and obtain credentials which will be used on later accesses. In an example, the subsequent accesses are carried out as follows:

The user device (1) connects to the server (2);
the user device (1) authenticates with the server (2) with the credentials;
  if the authentication is not successful, the server (2) closes the connection with the user device (1), or
  if the authentication is successful, the server grants access to the user device (1) and informs the user that the authentication is successful;
the user device (1) subscribes, or requests access, to one or more nodes (5);
if the user device (1) does not have permissions to the requested node (5) or the node (5) does not exist, the server (2) rejects the subscription;
if the user device (1) has the permissions, the server (2) accepts the subscription, and sends the data as specified in the data transmission method.

The data transmission works on the basis of an event with finite duration, such as a racing event; the duration of the event starts at a time, or instant, $t_0$, and ends at a time $t_N$, with a number of N−1 intermediate instants each time interval i. The intervals can have any duration providing it is shorter than the duration of the event, but it is extremely advantageous that the intervals have a regular duration and as short as reasonably possible, preferably in the range of milliseconds. With such intervals, the latency in the transmission is unnoticeable for a human user, who perceives a real time update of the information.

Figure 2:
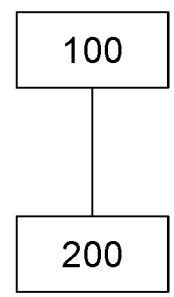
FIG. 2 This figure represents a flowchart of the method.

As shown in FIG. 2, in the first step of the method, at $t_0$, the server (2) sends (100) the whole data set (4), including the relations between nodes (5) and the content of the nodes (5) themselves, depending on the subscription of the user; this data is stored at the user device (1) at least during the whole event period, and displayed to the user.

Then, as the time starts running, the server (2) receives updated information and the data set (4) is modified accordingly. If, at a time $t_n$, the content of a node (5) to which a user is subscribed remains unchanged in respect of the previous instant $t_{n-1}$, the server does not send any data to the user device or devices (1). If, on the contrary, the data of the node (5) changes, then the server (2) sends (200) the updated data to the user device or devices (1); the transmitted data preferably comprises the information block contained in the node (5) plus an identification block containing the identification of the node (5).

It should be noted that the process is the same for any type of node (5), regardless of the hierarchy level of the node, or in other words, it can be a child node (5.3), a parent node (5.2), a grandchild node (5.4), a grandfather node and so on. In a specific example, the root node (5.1) can be updated too.

Once the event has finished, at $t_{N+1}$, a complete updated data set (4) is sent by the server (2) to the user device or devices (1) in preparation for a new event.

Figure 3A:
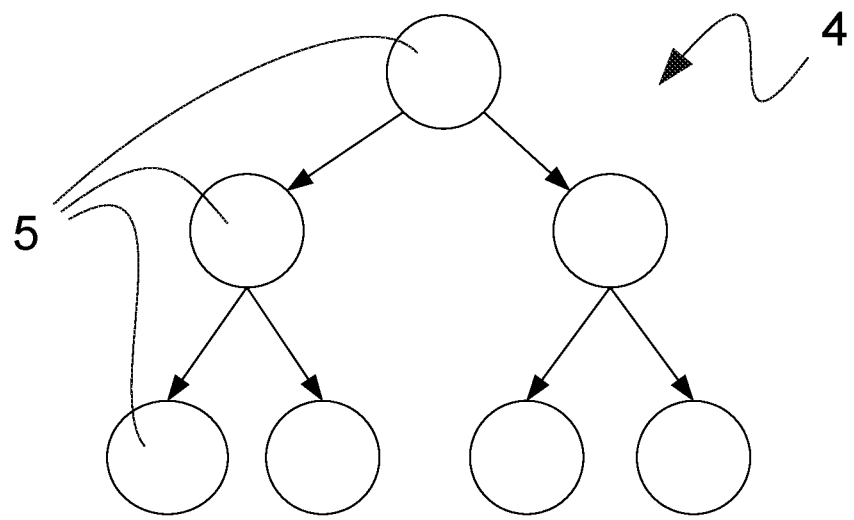
FIGS. 3a, 3b These figures represent two examples of the data set.

The data set (4) has a tree structure, comprising nodes (5) of information arranged according to different levels of hierarchy. FIG. 3a shows an example of a data set (4) with a high-level node (5), or root node, two mid-level nodes (5), or parent nodes, and four low level nodes (5), or child nodes, wherein the root node comprises the two parent nodes, and each parent node comprises two child nodes. The example shown in FIG. 3a is only a possible arrangement for the data set (4), and many other layouts are possible.

Figure 3B:
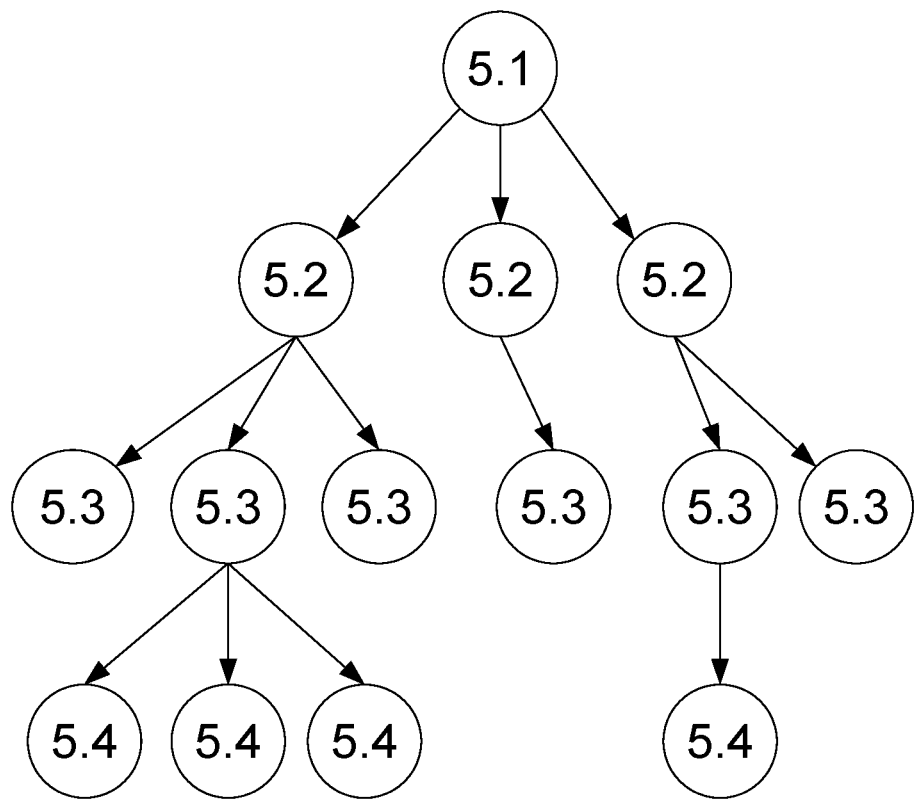

FIG. 3b shows a more complex layout, with a root node (5.1), parent nodes (5.2) with varying number of child nodes (5.3), and two of these child nodes (5.3) further comprising grandchild node (5.4).

The data set (4) is preferably configured with the child nodes (5.3) storing different types of data related to the same category, represented by a common parent node (5.2). In a specific example, the data set (4) is related to "people", and so the root node (5.1) might be labelled "People". The parent nodes (5.2) would be two individuals, labelled by their names, "Juan" and "Ana". Next, the child nodes (5.3) would be two attributes of the individuals, for example, age and occupation; the data set (4) of this example would look, arranged as a list as follows:

"PEOPLE"
    Name: Juan
        Age: 37
        Occupation: teacher
    Name: Ana
        Age: 24
        Occupation: doctor In a preferred implementation of the method, the data is sent encrypted as an SSL connection over TCP-IP or an equivalent encryption technique to ensure the security of the transmission; this measure not only hinders a malicious access attempt, but also prevents the access to the service to unauthorized users.

Since in the most likely scenario the user devices (1) will use different operative systems and/or standards, the data is preferably formatted as a .json file, which allows the compatibility with any software, regardless of the programming language used.

What is claimed is:

1. A data transmission method for the transmission of data between a server and at least one authenticated user device, the server comprising a data set stored in the server, and the at least one authenticated user device being in data communication with the server;
wherein the data set has a tree structure configuration, comprising at least a root node comprising at least one parent node, with each parent node comprising at least one child node, wherein the data of the at least one child node is updated at intervals of time i, and wherein the data of the at least one parent node is updated at intervals of time i;
the method comprising the steps of:
sending by the server, at a time $t_0=0$, the complete data set to the at least one authenticated user device, and
for each time $t_n=n\cdot i$, with n=1, . . . , N, when the data of the at least one child node has been updated in respect to the time $t_{n-1}$, sending in real-time by the server only the updated data of the at least one child node to the at least one authenticated user device, and when the data of the at least one parent node has been updated in respect to the time $t_{n-1}$, sending the updated data of the at least one parent node to the at least one authenticated user device, thereby minimizing bandwidth usage by avoiding retransmission of unchanged data in the data set and providing near-instantaneous updates to the at least one authenticated user device.

2. The data transmission method according to claim 1, further comprising the step of sending, at a time $t_{N+1}$, a complete updated data set to the at least one authenticated user device, wherein the complete updated data set includes all updated data of child nodes and parent nodes that have been modified since time $t_0$, and sending the updated data of the at least one child node or parent node to the at least one authenticated user device at each subsequent time interval $t_n$.

3. The data transmission method according to claim 1, further comprising the step of encrypting, by the server, the data of the data set using SSL encryption over TCP-IP protocol before transmission to the at least one authenticated user device.

4. The data transmission method according to claim 1, wherein the data set comprises one or more grandparent nodes hierarchically positioned above the at least one parent node, or one or more grandchildren nodes hierarchically positioned below the at least one child node, maintaining the tree structure configuration throughout the data transmission process.

5. The data transmission method according to claim 1, wherein the data set is formatted as a JSON file structure that maintains the tree configuration with parent-child node relationships for cross-platform compatibility.

6. The data transmission method according to claim 1, wherein the data of the data set comprises race timing measurements that are updated at the mathematical intervals $t_n=n\cdot i$ to provide real-time racing event status updates.

7. A computer program comprising instructions which, when the program is executed by the server, cause the server to carry out the data transmission method according to claim 1, wherein the server implements the mathematical timing framework $t_n=n\cdot i$ for coordinated transmission of updated child node and parent node data while minimizing bandwidth usage through selective transmission of only changed data elements.

* * * * *